Jan. 19, 1937. G. C. ENGBRECHT ET AL Re. 20,247
PRESSING AND IRONING MACHINE
Original Filed Oct. 8, 1931 5 Sheets-Sheet 1
Fig. 5.
Fig. 1.
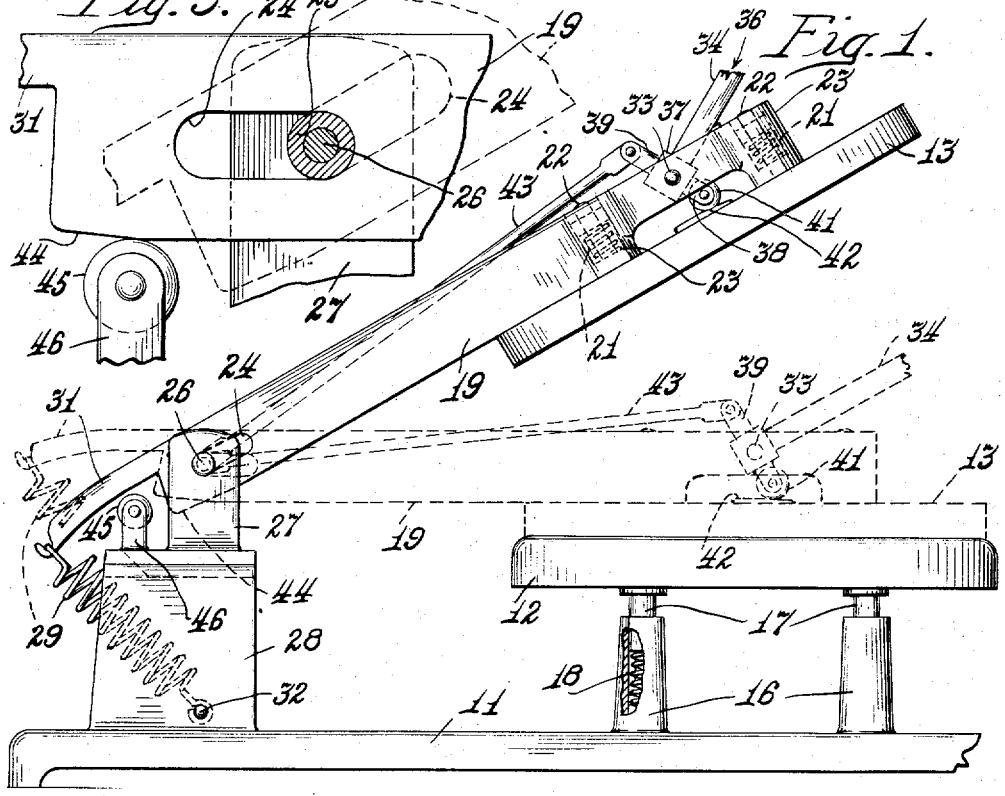
Fig. 2.
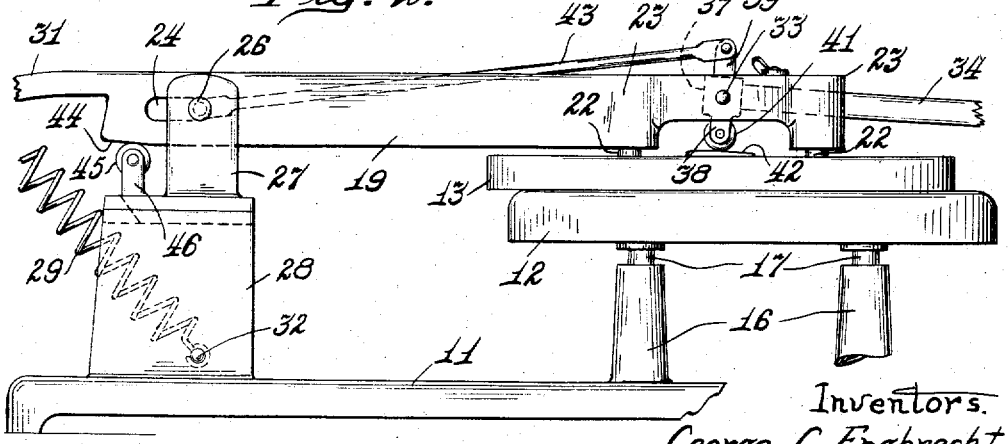
Inventors.
George C. Engbrecht,
Anton M. Olsen,
& Arthur J. Olsen.
Daniel J. Brennan
Attorney.

Jan. 19, 1937. G. C. ENGBRECHT ET AL Re. 20,247
PRESSING AND IRONING MACHINE
Original Filed Oct. 8, 1931 5 Sheets-Sheet 2
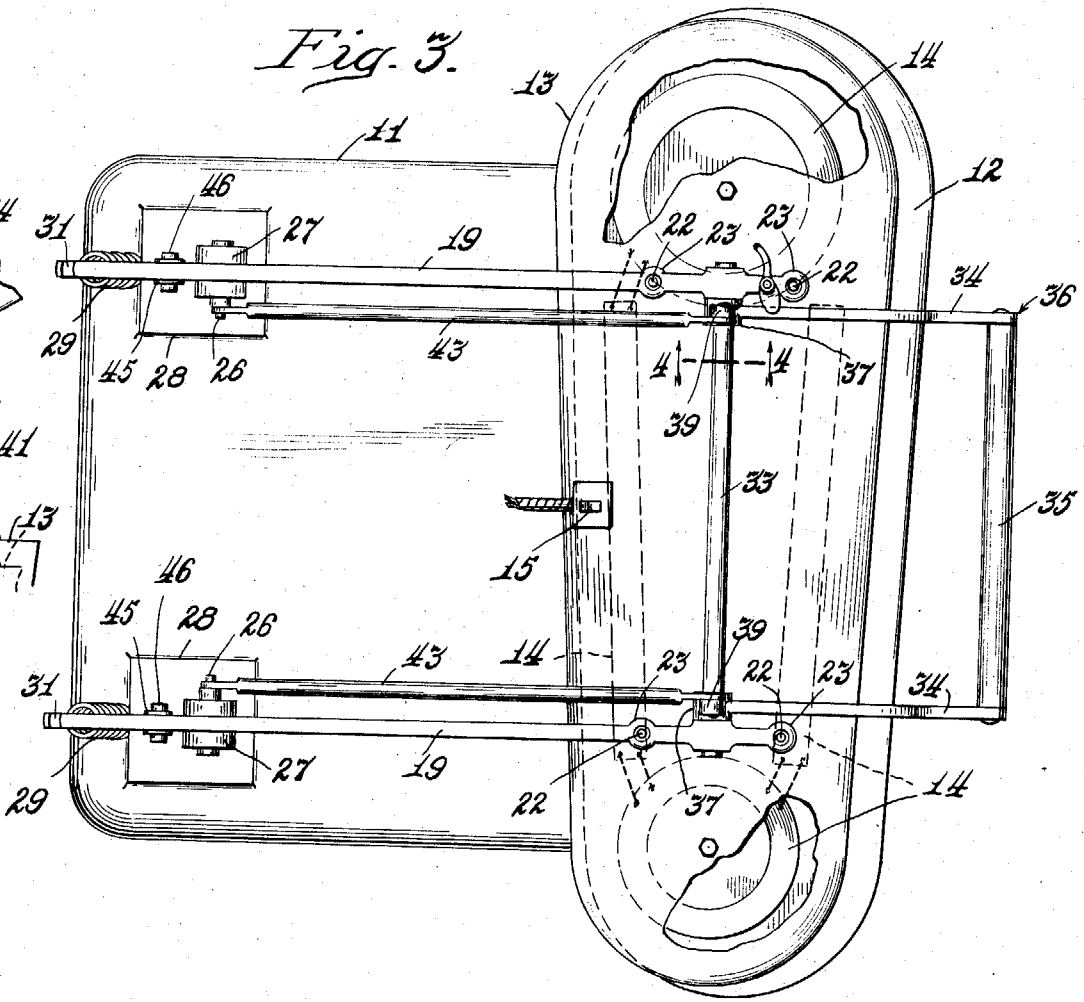
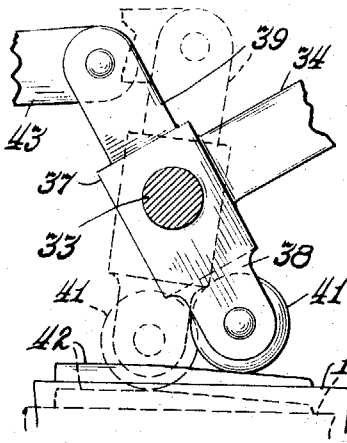
Inventor
George C. Engbrecht,
Anton M. Olsen,
& Arthur J. Olsen.
Daniel B. Brennan
Attorney.

Jan. 19, 1937. G. C. ENGBRECHT ET AL Re. 20,247

PRESSING AND IRONING MACHINE

Original Filed Oct. 8, 1931 5 Sheets-Sheet 3

Inventors.
George C. Engbrecht,
Anton M. Olsen,
and Arthur J. Olsen.
Daniel G. Brennan
Attorney.

PRESSING AND IRONING MACHINE

Original Filed Oct. 8, 1931 5 Sheets-Sheet 4

Inventors.
George C. Engbrecht,
Anton M. Olsen,
and Arthur J. Olsen.
Daniel P. Brennan
Attorney.

Jan. 19, 1937. G. C. ENGBRECHT ET AL Re. 20,247
PRESSING AND IRONING MACHINE
Original Filed Oct. 8, 1931 5 Sheets-Sheet 5
Fig. 15.
Fig. 13.
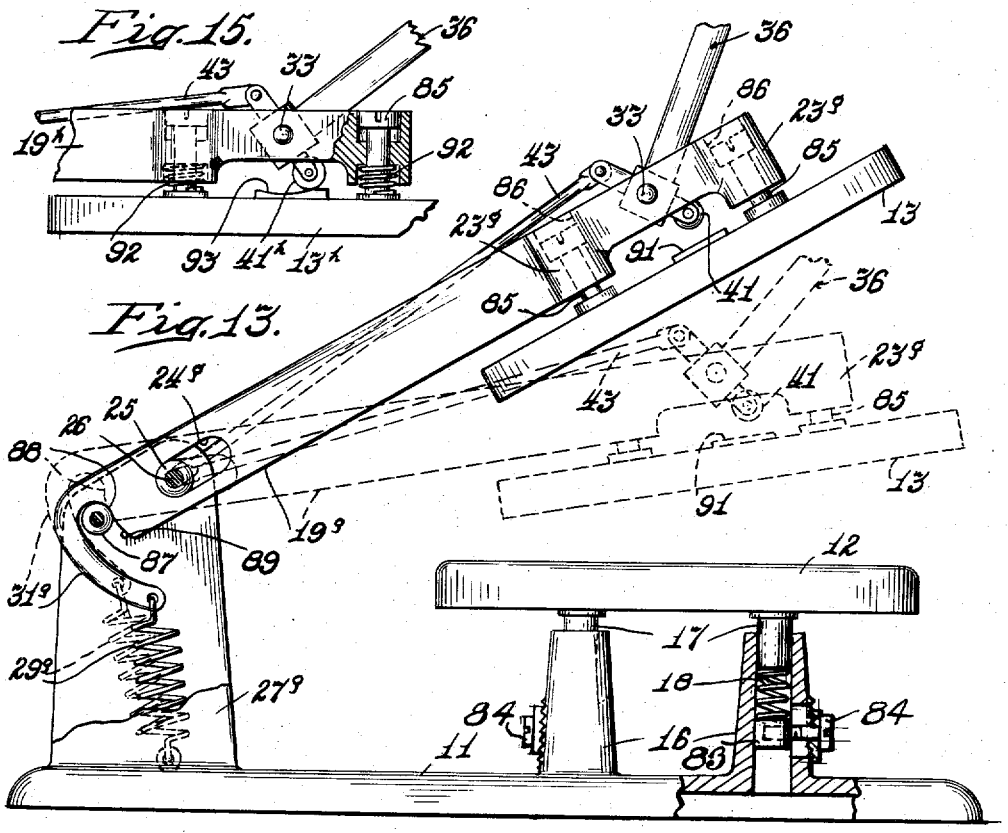
Fig. 14
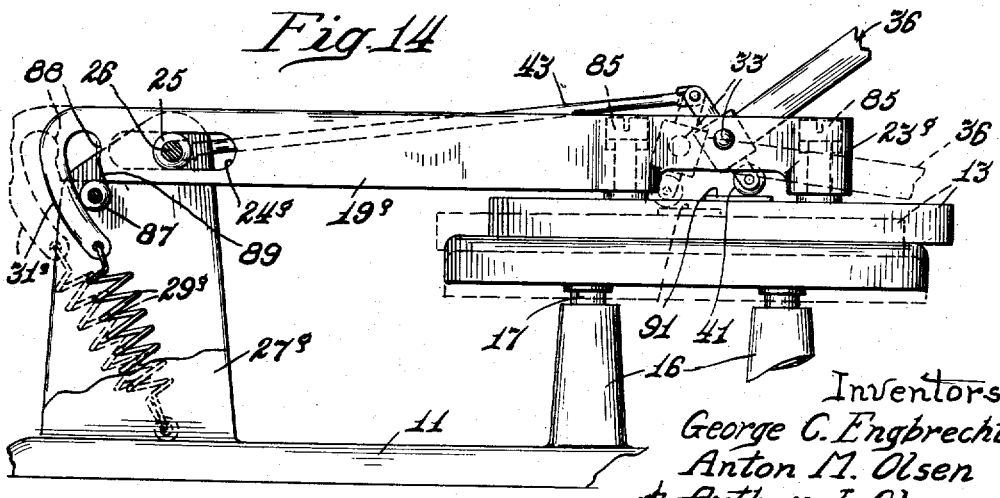
Inventors.
George C. Engbrecht,
Anton M. Olsen
& Arthur J. Olsen
Daniel P. Brennan
Attorney.

Reissued Jan. 19, 1937

Re. 20,247

UNITED STATES PATENT OFFICE 20,247

PRESSING AND IRONING MACHINE

George C. Engbrecht and Arthur J. Olsen, Chicago, Ill., and Anton M. Olsen, Milwaukee, Wis., assignors to Permo Products Corporation, a corporation of Illinois Original application October 8, 1931, Serial No. 567,648. Divided and application August 27, 1934, Serial No. 741,698. Original No. 1,981,410, dated November 20, 1934. Application for reissue November 20, 1936, Serial No. 111,862. In Canada February 25, 1932

31 Claims. (Cl. 38—32)

This application is a division of our co-pending application, Serial No. 567,648, filed October 8, 1931. The invention relates to improvements in pressing and ironing machines and more particularly to an improved portable garment pressing and ironing machine having single manually operable means to move one of the pressing elements into pressing engagement with the other pressing element and to effect relative reciprocable movement of said elements while in pressing engagement.

An object of the invention is to provide a pressing machine with improved operator controlled actuating means whereby the entire operation of the machine may be controlled by manipulation of a single operating handle.

Another object is to provide a pressing and ironing machine of the character described with improved control means operable to actuate the presser and impart a reciprocable lateral movement to one or both of the pressing elements.

Another object is to provide a pressing machine with improved yieldable means to urge the pressing head tightly against the pressing buck.

Another object is to provide a pressing and ironing machine of the type having a pivotally mounted pressing element movable toward and away from the pressing buck, with improved counter-balancing means for relieving the operator of the full weight of the pressing element.

Another object is to provide a pressing and ironing machine having manually operable means to move the pressing element over the face of the pressing buck when the parts are in pressing engagement, with improved means to return the parts automatically to normal pressing position upon release of the operable means.

Another object is to provide a portable pressing and ironing machine incorporating the improved features set forth hereinbefore, which is simple, efficient, and positive in operation, durably constructed, and inexpensive to manufacture and maintain.

The foregoing and such other objects of the invention, as will appear hereinafter as the description proceeds, will be more readily understood from a perusal of the following specification, reference being had to the accompanying drawings, in which:

Fig. 1 is a side elevational view of the improved pressing and ironing machine showing the pressing element raised, in full lines, and in pressing engagement with the buck, in dotted lines.

Fig. 2 is a view similar to Fig. 1 showing the pressing element locked tightly against the buck.

Fig. 3 is a plan view of the pressing machine, shown in the position illustrated in Fig. 2.

Fig. 4 is an enlarged vertical sectional view taken substantially on line 4—4 of Fig. 3.

Fig. 5 is an enlarged fragmentary sectional view showing the presser arm mounting.

Fig. 13 is a side elevational view similar to Fig. 1, showing an ironing machine embodying modified features of construction.

Fig. 14 is a view similar to Fig. 13, showing parts of the ironing machine in another position.

Fig. 15 is a fragmentary side elevational view of a pressing element showing a modified mounting for the pressing head.

Figure 6:
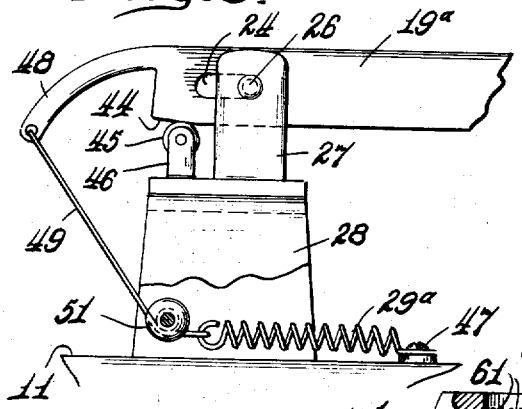
Fig. 6 is a fragmentary side elevational view showing a modified form of mounting for the presser element.

The improved pressing and ironing machine shown in the accompanying drawings is primarily designed as a portable machine for use within a home. Known types of pressing machines having a pressing element movable toward and away from the buck are too heavy and massive, and require considerable floor space, because of the complicated actuating mechanism therein. The improved pressing and ironing machine is compact, simply constructed, and light in weight, said machine comprising generally, a base plate 11 having a buck 12 yieldably mounted thereon to receive in pressing engagement therewith, a pressing head 13 pivotally and slidably mounted in bearings carried by the base plate 11. When in use the pressing head 13 is moved down against the buck to press an article therebetween and if ironing is desired, the head may be moved over the face of the buck to impart a gloss or sheen to the article being pressed.

Known pressing and ironing machines of this general character, utilize live steam to heat the pressing head which is objectionable since such means necessitates the maintenance of a steam supply and intricate piping, thus defeating one of the purposes of the improved design, namely; lightness, compactability, and portability. In the improved machine electrical heating units 14 are provided and arranged within the pressing head to insure uniform heating of the entire effective surface of the pressing head. The current supply to these units may be controlled by a manually operated or thermostatically controlled switch 15 conveniently mounted on the pressing head, as shown in Fig. 3.

As shown in Figs. 1 to 5, inclusive, the buck 12 preferably is yieldably mounted on the base plate 11 by a plurality of spaced vertically disposed bosses 16 each of which is cored or otherwise provided with a recess to receive one of a plurality of spaced legs 17 extending downwardly vertically from the under side of the buck. Compression springs 18 are provided one beneath each leg 17, within the bosses 16, to hold the buck in position for engagement by the head when the latter is brought down thereagainst. The pressing head 13 preferably is yieldably mounted on the under side of and adjacent one end of a pair of spaced parallel arms 19. The head 13 normally is held tightly against the arms 19 by springs 21 co-operating with spaced pins or plungers 22 each of which extends through a hollow boss 23, two of which are provided on each arm.

The arms 19 extend rearwardly from the pressing head 13 and each is provided, adjacent its free end, with a short longitudinal slot 24 for receiving therein a roller 25 carried by a pin 26 mounted in bearing brackets 27. Each bearing bracket 27 preferably is supported above the base plate 11 by a suitable inverted substantially U-shaped mounting 28. Springs 29, each secured at one end to one of the extensions 31, provided one on the end of each arm 19, and at the other end to one of the pins 32 anchored in the mountings 28, normally balance or hold the pressing element, comprising arms 19 and pressing head 13, elevated above the buck 12 substantially in the position shown in full lines in Fig. 1. The springs 29, because of their angular disposition, also urge the arms 19 forwardly to bring the rear end of slots 24 against the associated rollers 25 when the pressing element is in raised position.

Extending between the arms 19, substantially in vertical alignment with the longitudinal axis of the pressing head 13, is a rod 33 carrying, for rotating, forwardly and upwardly extending spaced arms 34 connected at their forward ends by a cross member 35. The arms 34 together with the cross member 35 provide a manually controlled operating handle 36. Each arm 34 has a boss 37 bored to receive the rod 33, and said bosses are each provided with spaced ears 38, extending substantially at right angles to the arms 34, and a lug 39 extending in the opposite direction. A roller 41 is journaled between each pair of ears 38 for co-operating, in a manner to be described hereinafter, with one of a pair of cam surfaces 42 on the upper side of the pressing head. A pair of links 43 are provided one connected at one end to each of the bearing pins 26, and at their other ends to the lugs 39.

To actuate the machine, the operating handle 36 is moved downwardly manually carrying the pressing element into pressing engagement with the buck 12 substantially as shown in dotted lines in Fig. 1. After the pressing head is in pressing engagement with the buck 12, continued movement downwardly of the handle 36 (Fig. 2) turns the handle about the rod 33 causing the rollers 41 to travel along the cams 42 urging the pressing head 13, against the action of springs 21, tightly against the yieldably mounted buck. During this movement of tightly pressing the head against the buck 12, the entire pressing element (head and arms) is urged rearwardly, by links 43, until the forward end of slots 24 abut rollers 25. While the pressing element is moving rearwardly to iron, the tapered lower end surfaces 44 of arms 19 co-act with guide rollers 45, supported in brackets 46 extending upwardly from the mounting members 28 rearwardly of brackets 27, and lock the arms substantially horizontally to insure positive downward movement of the pressing head by actuation of cam rollers 41.

Movement of the entire pressing element about its pivotal mounting 25 without rearward, or independent downward movement of the pressing head 13 relative to the arms 19, is accomplished by having greater tension in the combined springs 21 than in the balancing springs 29, hence the pressing element must be substantially horizontal before independent downward movement of the pressing head can be effected. If desired, the ironing feature need not be used by returning the entire pressing element to raised position after reaching the pressing position shown in dotted lines in Fig. 1. The ironing feature may also be dispensed with permanently by removing the links 43. By anchoring the lower ends of the springs 29 substantially in vertical alignment with the axis of the pivot 26, as shown, the effort required to raise the pressing element is maintained at a minimum and the tendency of said springs to urge the entire pressing element forward the length of the slots is increased.

In Fig. 6 a modified form of spring mounting is shown, in which each spring 29ᵃ is secured at one end in a substantially horizontal position by a screw or other anchor 47. The other ends of the springs are connected to the extended end 48 of the arms 19ᵃ by cables 49 passing around a guide roller 51 mounted between the side walls of the mountings 28.

Figure 7:
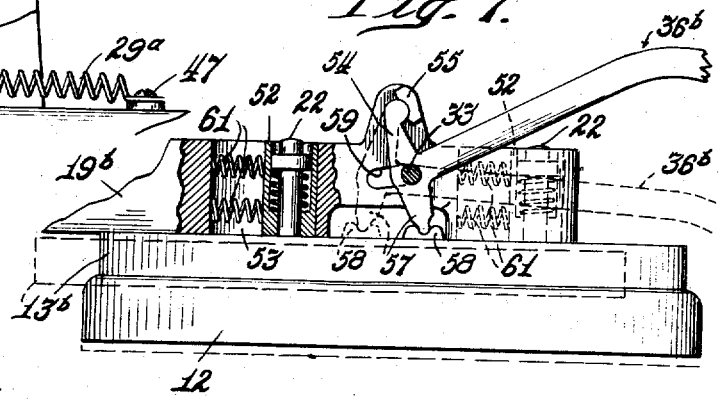
Fig. 7 is a fragmentary elevational view, partly in section, showing a modified manner of mounting the pressing head on the supporting arms.
Figure 9:
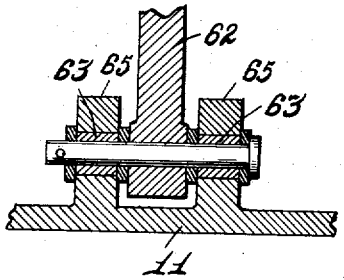
Fig. 9 is a vertical sectional view taken on line 9—9 of Fig. 8.

In Fig. 7 a modified mounting for the pressing head is shown. In this structure, the arms 19ᵇ are pivotally mounted at their rear ends and the pressing head 13ᵇ is mounted thereon to slide across the face of the buck 12 independently of said arms. As shown, the pressing head 13ᵇ is provided, as before, with plungers or pins 22 which, in this instance, are mounted yieldably in sleeves 52 slidably carried in slots 53 in the arms 19ᵇ. The operating handle 36ᵇ has lugs 54 formed on and extending upwardly of the arms 19ᵇ for co-operative engagement with a fixed socket 55 on each arm 19ᵇ. The operating handle also has a toothed lug 57 on each arm adapted to co-operate with a notch in a raised portion 58 on the top surface of the pressing head 13ᵇ. In this form, the rod 33 is fixedly secured to the handle 36ᵇ, and each end of said rod is slidably mounted in a rearwardly downwardly inclined slot 59, one provided in each arm 19ᵇ.

After the pressing element has been brought down into pressing engagement with the buck 12, continued downward movement of the operating handle 36b into the position substantially as shown in dotted lines (Fig. 7) causes the rod 33 to travel downwardly toward the rear end of slots 59 thus urging the pressing head tightly against the buck 12 and across the face thereof. The combined efforts of the springs 21 and 61 return the pressing head to normal position upon raising the operating handle.

Figure 8:
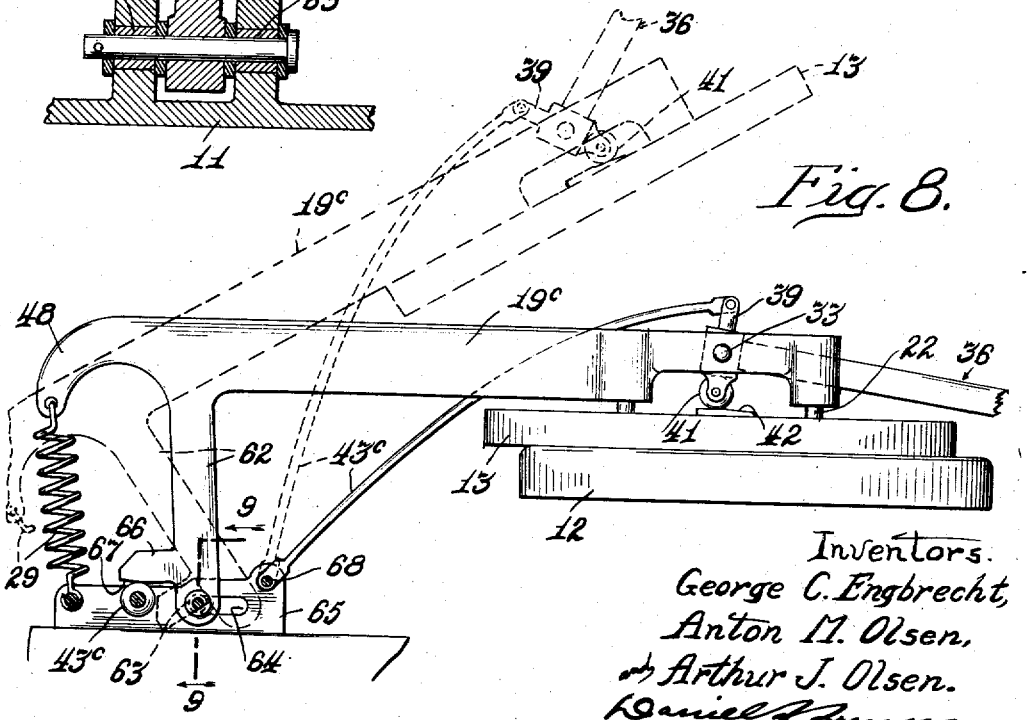
Fig. 8 is a fragmentary side elevational view showing another modified form of mounting for the pressing element.

The pressing and ironing machine shown in Fig. 8 is substantially like the machine shown in Figs. 1 to 5, inclusive. In this instance the arms 19c are pivotally and slidably mounted below the plane of the pressing element when the latter is horizontal. As shown, the arms 19c have downwardly directed extensions 62 each carrying a pair of rollers 63 adapted to travel in slotted bearings 64 formed in spaced flanges 65 on the base plate 11. The extensions 62 also are each provided with an extension 66 having a cam surface 67 co-operating with one of the rollers 43c journaled between the companion flanges 65 forming the bearings. The rear ends of the arched links 43c are, in this embodiment, pivotally secured by pins 68 to flanges 65. The advantage of providing a construction such as is shown in this figure is readily apparent since the pressing head, which constitutes a greater part of the weight of the pressing element, is, while in pressing engagement with the buck, positioned above the bearings of the arms, and the pressing head, while being raised, does not have to travel vertically.

Figure 10:
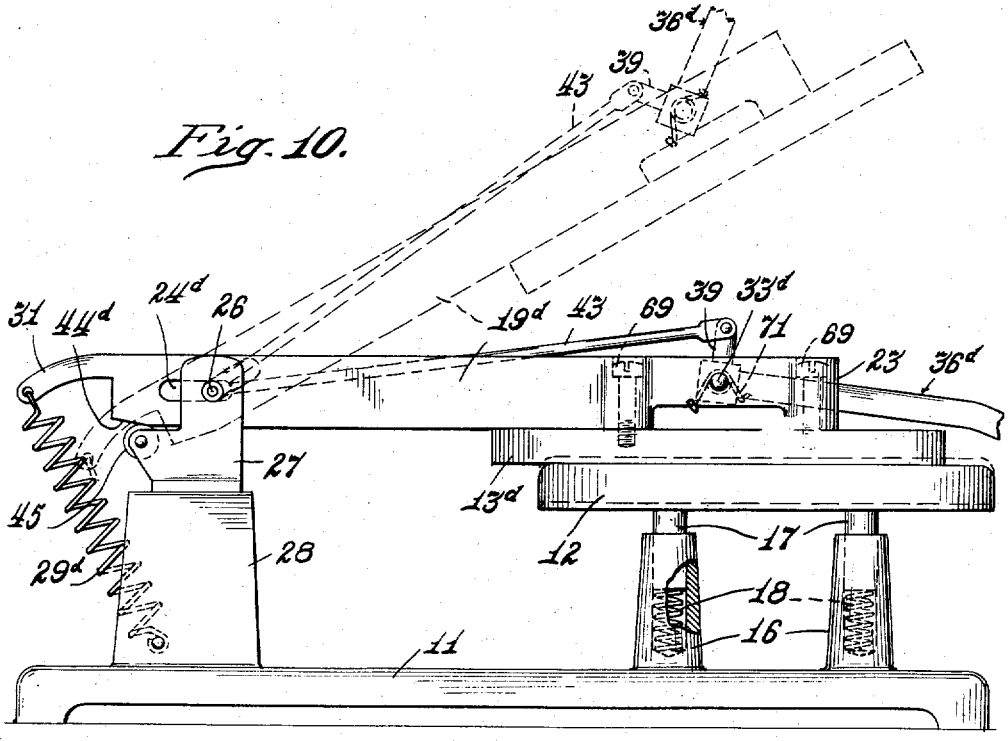
Fig. 10 is a side elevational view illustrating another modified structure.

In the ironing-press shown in Fig. 10, the pressing head 13d is fixedly secured to the arms 19d by machine screws 69. When the pressing element is against the buck continued downward movement of the operating handle 36d carries the pressing element rearwardly by reason of the sliding bearings at 24d, which are substantially like the structure previously described and shown in detail in Fig. 5. In this instance, however, the pitch of the cam surfaces 44d is increased to effect actual downward movement of the pressing element while said element is traveling rearwardly over the face of the buck. In this form of construction, suitable springs 71, of greater tension than springs 29d, are provided about the rod 33d to insure complete downward swinging of the pressing element before the ironing motion is effected.

Figure 11:
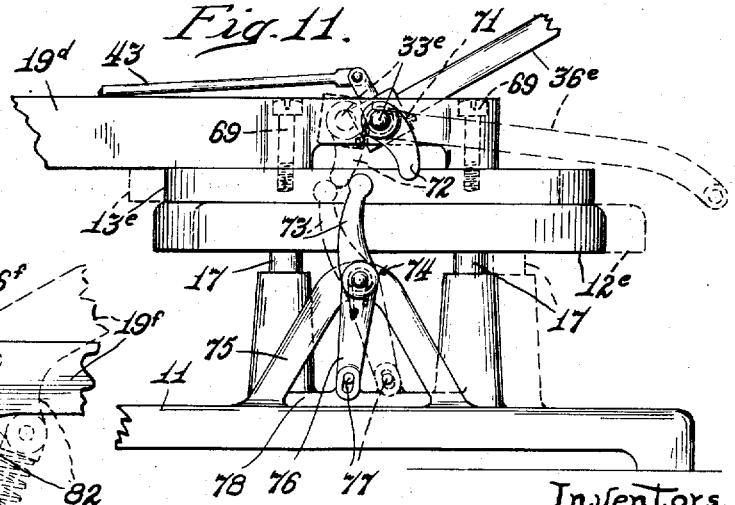
Fig. 11 is a fragmentary side elevational view showing a pressing and ironing machine having a sliding pressing head and a sliding buck.

The pressing machine illustrated in Fig. 11 includes a pressing element preferably substantially like that shown in Fig. 10 and described hereinbefore, but in this structure the buck 12e and the pressing head 13e are arranged to slide laterally simultaneously in opposite directions. As shown, the rod 33e has on each end a fixed actuating finger 72, each arranged to co-operate with one arm 73 of associated bell-crank levers 74 one of which is pivotally supported on each of a pair of bearing brackets 75 carried by the base plate 11e. Manipulation of the operating handle 36e urges the bell-cranks, through fingers 72 about their pivots causing their other arms 76, which are connected at 77 to a slide plate 78 carrying the buck 12e, to move forwardly. Forward movement of the slide plate carries the buck across the bottom face of the pressing head which also is traveling laterally in the opposite direction in the manner hereinbefore described.

Movement of the buck 12e may be effected by independent operating means, however, it is preferable, since it improves the efficiency of the ironing machine and simplifies its construction and operation, to provide the single means shown.

Figure 12:
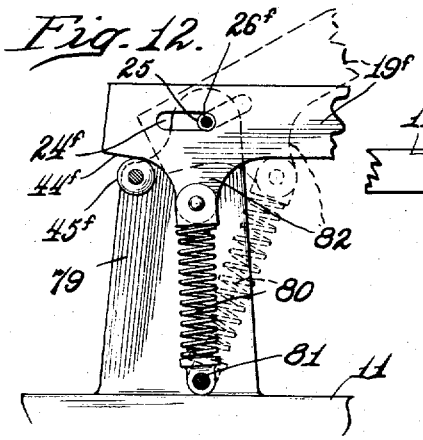
Fig. 12 is a vertical sectional view of the arm mounting for the pressing element, showing a modified form of spring mounting.

The pressing element arm mounting shown in Fig. 12 is substantially like the structure previously described, each mounting including a bearing pin 26f extending between pairs of flanges 79 one of which is shown in the drawings. The pressing element arms 19f are slotted as at 24f and each has a cam surface 44f for co-operating with the associated roller 45f while the pressing element is down against the buck.

The yieldable means provided, in this structure to urge the pressing element away from the buck preferably consists of compression springs 80 connected at one end to pins 81 in flanges 79 and at their other ends to lugs 82 extending from the lower side of arms 19f. It will be noted that the spring anchor pins 81 are in vertical alignment with the bearing pins 26f and, while the pressing element is in engagement with the buck, said springs are compressed and their connection with the arms 19f is moved beyond and out of alignment with pins 26f and 81 to provide, in effect, a toggle for yieldably locking the pressing element down. Slight upward movement of the pressing element brings the connection of the springs with the arms 19f through and beyond the vertical center of the bearings to break the toggle and said springs then urge, positively, the pressing element away from the buck into substantially the position illustrated in Fig. 12, in dotted lines.

The advantage of this form of spring mounting is readily apparent as the springs are not held extended as in the other arrangements while the pressing machine is not in use and the pressing element is locked down.

The alternate form of construction of the pressing and ironing machine illustrated in Figs. 13 and 14, includes a base plate 11 carrying bearing brackets 27g. The buck 12 is yieldably mounted in the spaced vertically disposed bosses 16. As shown in Figure 13, an adjustable block 83 is provided in each boss for backing up the springs 18 whereby the initial position of the buck may be readily varied by manipulation of lock screws 84. This last mentioned arrangement is claimed in said parent application Ser. No. 567,648 and is not claimed herein. The pressing head 13 is, in this instance, freely attached to the supporting arms 19g (only one being shown) by suitable means, such as for example, machine screws 85, the heads of which are received in counter-bored recesses 86 in bosses 23g. The pressing head 13 normally is suspended from the arms 19g while the pressing element is in raised position and, when said element is brought down against the buck, the head and arms are brought together as shown in full lines in Fig. 14.

The arms 19g have the slotted bearings 24g adjacent their free ends to receive the bearing rollers 25 supported in brackets 27g by pins 26, and their extreme ends have downwardly curved arms 31g for connection with one end of the associated balancing springs 29g. When the pressing element is in raised position, (Fig. 13) the guide rollers 87 cooperate with recesses or depressions 88 in the arms to retain said arms elevated. When the operating handle 36 is engaged preparatory for moving the pressing head down against the buck, initial movement of the arms 19g moves the recesses 88 away from rollers 87 and as the arms continue downwardly the arcuate surfaces 89 thereon co-act with and travel over said rollers until the arms 19g are substantially horizontal.

The operating handle 36 is connected by links 43 to the bearing pins 26 and after the pressing element engages the buck, continued downward movement of the handle 36 moves the pressing element rearwardly (by reason of the links 43) into the position substantially as illustrated in dotted lines in Fig. 14. During the rearward travel of the pressing element, the cam roller 41, carried by the operating handle 36, co-operates with wear plate 91 on the upper face of the pressing head 13, which is now against the arms 19g, to urge said pressing head downwardly against the yieldably mounted buck, said head and buck assuming the position substantially as shown in dotted lines in Fig. 14.

While the pressing head is being locked and during the time it is locked down tightly against the buck, upward movement of the pressing element is prevented by engagement of the rollers 87 with arms 19g rearwardly of bearings 26. The advantage derived from this structure is readily apparent since operation of the handle 36 is not required to overcome springs holding the pressing head against the arms as previously described with reference to the structure shown in Fig. 1. It also will be noted that little effort is required to move the pressing element down, from its raised position, against the buck. The position of springs 29g is such that they are subjected to little expansion or contraction during the entire movement of the pressing element. The rollers 87 tend to retain the rear ends of slots 24g tightly against the rollers 25 during the downward movement of the pressing element, hence the operator is at no time put to the necessity of forcibly retaining said arms in their proper position. While the pressing element is being raised, co-operation of rollers 87 with the arcuate surfaces 89 on the arms provides means to prevent the springs 29g from pulling the pressing element upwardly rapidly with the possible result of injury to parts. The entire unit is well balanced by the improved structure and is highly efficient and simple to operate.

The pressing head mounting shown in Fig. 15 is substantially like that illustrated in Figs. 13 and 14, however, in this form springs 92 are provided to urge the pressing head 13h away from the arms 19h, thus eliminating any possibility of undue wearing or rattling of the parts. In this structure the arms 19h are moved against the pressing head when the latter is brought into engagement with the yieldable buck. After such engagement, continued downward motion of the operating handle 36, causes the cam roller 41h carried thereon, to engage and co-act with the arcuate surface 93 provided on the upper face of the pressing head, for urging said head tightly against the buck, the springs 92 aiding in this operation. The arcuate surface 93 provided affords means to maintain the pressure applied to the pressing head constant during the downward movement of the operating handle 36 following the initial application of pressure when the roller 41h first engages said surface.

Although exemplary forms of the improved pressing and ironing machine have been illustrated in the accompanying drawings and described in detail in the foregoing specification, it is to be understood that various details in the structure, not shown, may be employed and the features shown in the various embodiments herein disclosed may be interchanged without departing from the spirit of the invention or the scope of the appended claims.

We claim:

1. A garment ironing machine including a pressing head and a buck, a movable supporting member on which said head is mounted, said head and member being movable toward and away from said buck and laterally thereof, an operating handle mounted on said member for moving said head toward and away from said buck, said handle being movable relative to said member, means actuated by said handle to move said support laterally of the buck and slide said head over the face of the buck while said parts are in pressing engagement, means to lock said parts in pressing engagement, and cam means actuated by movement of the handle to urge the head tightly against said buck.

2. In a pressing and ironing machine, the combination of, a garment receiving buck, a pressing head, a supporting member for said head, a mounting in which said member is movably supported, a handle on said member for moving said head toward and away from said buck, said handle being movably mounted on said member, means co-operating with said supporting member to hold said head against said buck, cam means actuated by said handle to urge the pressing head tightly against the buck, and means also actuated by said handle to move said supporting member in its mounting and to move said pressing head across the face of the buck while the pressing head and buck are in pressing engagement.

3. A pressing and ironing machine including a head and a buck, arms supporting said head, said arms being pivotally and slidably mounted adjacent one end, a handle on said arms for moving said head toward and away from said buck, said handle being movable relative to said arms, and means actuated by said handle to slide said arms in their mounting to move said head across the face of the buck while said head is in pressing engagement therewith.

4. A pressing and ironing machine including a head and a buck; arms, pivotally and slidably mounted adjacent one end, supporting said head; a handle movably mounted on said arms for moving said head toward and away from said buck; means actuated by said handle for sliding said arms in their mounting to move the head across the face of the buck while said head is in pressing engagement therewith; a cam surface on each of said arms and rollers on said mounting adapted to co-operate with said surfaces to urge the pressing head tightly against said buck.

5. In a pressing and ironing machine including a head and a buck, arms pivotally and slidably mounted adjacent one end supporting said head, a handle movably mounted on the arms for moving said head toward and away from said buck, means actuated by said handle for sliding said arms in their mounting to move the head across the face of said buck while said head is in pressing engagement therewith, and means co-operating with each arm to hold said head tightly against the buck.

6. A pressing and ironing machine having, in combination, a head and a buck, said head being mounted on one end of arms each pivotally and slidably mounted adjacent their other ends, a handle movably mounted on said arms for moving the head toward and away from said buck, springs, one associated with each of said arms, to aid movement of said head away from said buck, and means actuated by said handle to slide said head over the face of the buck while said head is in pressing engagement therewith and to lock said head down.

7. A pressing and ironing machine having in combination, a pressing element and a buck, said pressing element including arms slidably and pivotally mounted adjacent one end and having a pressing head secured thereto adjacent the other end, springs associated wtih said arms to normally hold said pressing element raised, a handle movably mounted on the pressing element to facilitate lowering of said pressing element to bring the head against the buck, and means actuated by said handle to slide the arms to move the head laterally across the face of said buck while the head and buck are in pressing engagement and to lock said pressing element down.

8. A pressing and ironing machine comprising, in combination, a head and a buck, a pressing element including pivotally and slidably mounted arms supporting said head, a handle on the pressing element for moving said head into and out of engagement with said buck, said handle being movable relative to said arms, a cam surface on each of said arms, means co-operating with said cam surfaces to urge the head tightly against the buck while the head and buck are in engagement and means actuated by said handle to slide said arms in their mounting to bring said cam surfaces and said last named means into engagement.

9. A pressing and ironing machine including a buck, a pressing element including pivotally and slidably mounted arms supporting a head, a handle on the pressing element for moving the head toward and away from said buck, a cam surface on each of said arms, rollers on the arm mounting arranged for co-operative engagement with said cam surfaces to urge the head tightly against the buck while the head and the buck are in engagement, said handle being movable relative to said element, and means actuated by said handle to move the pressing element and draw the head across the face of the buck.

10. A pressing and ironing machine including a pressing head and buck, pivotally and slidably mounted arms supporting the head and yieldable means acting on said arms for holding said pressing head above said buck, a handle on said arms for moving the arms to carry the head toward and away from the buck, said handle being movable relative to said arms, means actuated by said handle to slide the arms and move the pressing head across the face of the buck while in engagement therewith, means co-operating with said arms to hold said head in engagement with said buck, and means carried by said handle to move the pressing head tightly against the buck independently of movement of said arms.

11. A pressing and ironing machine comprising, in combination, a pressing element and a buck, said pressing element including arms slidably and pivotally mounted adjacent one end having a head secured adjacent their other end, springs associated with said arms to normally hold said pressing element raised, a handle movably mounted on the pressing element to facilitate lowering of said pressing element to bring head against the buck, means actuated by said handle to slide the arms to move the head over the face of said buck while the head and buck are in pressing engagement, and means co-operating with said arms to hold the pressing element down.

12. A garment pressing machine comprising, in combination, a pressing head and a buck, pivotally and slidably mounted arms supporting said pressing head, yieldable means acting on said arms for holding said head spaced above said buck, said head being movable into pressing engagement with said buck, a handle movably mounted on said arms, and means operatively connecting said handle with the arm mountings operable by said handle to slide said arms in their mountings to carry the head across the face of the buck while said head and buck are in pressing engagement.

13. A pressing and ironing machine comprising, in combination, a head and a buck, arms pivotally and slidably mounted adjacent one end thereof, said head being supported by said arms for pivotal and slidable movement therewith, a handle on said arms for moving the head and arms toward and away from said buck, said handle being movable relative to the arms, and means actuated by said handle to slide the arms to move the head across the face of the buck while the head is in pressing engagement therewith.

14. A pressing and ironing machine comprising, in combination, a head and a buck, said head having parts slidably mounted on pivotally mounted arms, springs normally holding said head spaced from said arms, means movably mounted on said arms for moving the head into engagement with said buck, means co-operating with said arms to lock said head down, and means actuated by said head moving means to assist said springs to urge the head tightly against the buck.

15. A machine of the character described, comprising, in combination, a head and a buck, arms supporting said head above said buck, yieldable means normally holding said head spaced from said arms, a handle movably mounted on the arms to move said arms to bring the head into engagement with said buck, means co-operating with said arms to lock said head down, said engagement moving the head into abutment with the arms, and means on said handle co-operating with said head to urge said head tightly against said buck.

16. A machine of the character described comprising, in combination, a head and a buck, arms supporting said head above said buck, yieldable means normally holding said head spaced from said arms, a handle movably mounted on said arms to move said arms and bring said head into engagement with said buck, means co-operating with said arms to lock said head down, said engagement moving the head into abutment with the arms, means on said handle co-operating with said head to urge said head tightly against said buck, and means operable by said handle to move the head across the face of said buck while in pressing engagement therewith.

17. A machine of the character described comprising, in combination, a head and a buck, said head being movably mounted on a pivotally mounted support, a handle movably mounted on said support and operable in a direction parallel to a vertical plane extending from the front to the rear of the machine for moving the support and head toward and away from said buck, means actuated by movement of said handle in said vertical plane relative to said support to slide said support and head laterally thereover while said head is in engagement therewith, said movement locking said support down and moving the head relative to the support to press the head tightly against the buck, and yieldable means to return said head to its original position over said buck upon reverse movement of the handle.

18. A garment pressing and ironing machine including similarly shaped co-operative pressing elements, pivotally mounted slidable means supporting one of the elements and having a handle movably mounted thereon operable for moving said one element into and out of pressing engagement with the other pressing element, and means actuated by movement of the handle while the pressing elements are in pressing engagement to slide said pivotally mounted slidable means to move the movable element across the face of the other element.

19. A garment pressing and ironing machine comprising, in combination, a pressing head and a buck, pivotally mounted slidable arms and balancing means supporting said pressing head normally spaced above said buck, a handle on the arms for moving said head toward and away from said buck, said handle being movable relative to said arms, means operatively connecting said handle with the arm mounting operable by said handle to move said head across the face of the buck while the head and buck are in engagement, means co-operating with said arms to hold said head and buck in engagement, and means on said arms adapted to co-operate with and urge said head tightly against the buck while said head is traversing said buck.

20. An ironing machine including similarly shaped co-operating pressing elements having, in combination, means, including a handle movable through an arc in a direction parallel to a plane extending from the front to the rear of the machine, said handle being operatively connected with one of said elements to move the same into and out of engagement with the other element, and means actuated while said elements are in engagement by continued movement of said handle in the same general direction through said arc to move the movable element across the face of the other element.

21. A machine of the character described comprising, in combination, a head and a buck, said head being movably mounted on a pivotally mounted support, a handle on said support operable in a vertical plane extending from front to back of the machine to facilitate movement of the support and head against and away from said buck, means actuated by movement of said handle in the same general direction in said vertical plane independently of the pivotal movement of said support and head while said head is against the buck to slide the head over the face of the buck, and yieldable means to slide said head to its original position over said buck upon reverse movement of the handle.

22. A pressing machine comprising a frame, co-operating pressing elements, one being movable toward and from the other, and the latter being carried by the frame, a carrier for the movable element including a lever pivoted to the frame, means for moving the movable element relatively to the lever into clamping co-action with the other element including an operating member, means controlled by said operating member for locking the lever in its position assumed when the press is closed, and means tending to open the press.

23. In a pressing machine, a base, co-operative pressing elements one being movable toward and away from the other and the latter being carried by the base, a support for the movable element carried by the base and movable to carry the movable element into and out of position opposed to the other element, means for moving the movable element relative to its support into and out of clamping co-action with the other element, including an oscillatable operating handle mounted on said support and motion transmission means between the handle and the movable element, and interengaging locking means on said base and support and controlled by the operating handle for holding the support in its closed position, said locking means being controlled by the movement of the operating handle to move the movable element into final pressing position.

24. A pressing machine comprising a base, co-operating pressing elements, one being movable toward and from the other, and the latter being carried by the base, a carrier for the movable element including a lever pivoted to the base, means for locking said lever in a position to hold the pressing elements closed, means for moving the movable element relatively to the lever into clamping co-action with the other element including an operating member, and means controlled by said operating member for controlling said locking means to lock the lever in its position assumed when the press is closed.

25. A pressing and ironing machine including a base having, in combination, a buck on said base, an ironing head, a support for said head, said support being pivotally and slidably mounted on said base, a handle movably mounted on said support to facilitate movement of the support to carry the head toward and away from said buck, means co-operating with said support to aid movement of said head and support away from said buck, and means actuated by said handle to slide said head over the face of the buck while said head is in pressing engagement therewith and to lock said head down.

26. An ironing-press including a buck and a head, the latter being supported by a slidably movable support, said head being movable relative to the support, a handle on said support to move the support to carry the head toward and away from the buck, means for locking said support in a position to hold the head against said buck, said handle being movable relative to the support, and means actuated by said handle to move the head relative to the support into pressing engagement with the buck and to slide the support to carry the head across the face of the buck and lock the support in the position assumed when the head is against the buck.

27. In a garment pressing machine, a base, co-operating pressing elements, one of said elements being mounted on said base, the other element being movable toward and away from the one mounted on said base, a carrier for said movable element including an arm pivoted to the base, a stationary element on the base, said arm being movable in a direction other than that afforded by its pivotal mounting for effecting engagement with said stationary element to lock said arm in the position assumed when the press is closed, means movably mounted on said carrier to open and close the press and to bring said arm and stationary element into engagement to thereby lock said arm, and means tending to open the press.

28. A pressing machine comprising, in combination, a head and a buck, said head having parts slidably mounted on a pivotally mounted support, springs normally holding said head spaced from said support, means on said support operable to carry the support and head downwardly toward said buck and lock the head in engagement with the buck, and means actuated by said head moving means to assist said springs to urge the head tightly against the buck.

29. An ironing-press having, in combination, a base, a buck on said base, an ironing head, a movable support for said ironing head mounted on said base, interengaging locking means on said base and said support, said support being movable to carry the ironing head into and out of engagement with said buck, said head being movable laterally across the buck when the parts are in engagement, a handle movably mounted on said support, and operative connections between said handle and said base for producing by a single movement of the handle while the ironing head is in contact with the buck engagement of said locking means to hold said head in engagement with the buck and lateral movement of said ironing head across the buck.

30. An ironing-press having, in combination, a base, a buck on said base, an ironing head, said head being movable laterally across the buck, a movable support for said ironing head mounted on said base, said support being movable to carry the ironing head into and out of engagement with the buck, means for locking said support with the head in engagement with the buck, a handle movably mounted on said support, and operative connections between said handle and said base for producing by a single movement of the handle while the head is in engagement with the buck actuation of said locking means to hold said ironing head in engagement with the buck and lateral movement of said head across the buck.

31. A pressing and ironing machine having, in combination, a base, a buck on said base, an ironing head, a support for said ironing head pivotally and slidably mounted on said base, said support being movable pivotally to carry the ironing head into or out of engagement with said buck, means for locking said support with the head in engagement with the buck, a handle movably mounted on said support, and operative connections between said handle, said head, and said base for producing by a single movement of the handle while the head is in engagement with the buck, actuation of said locking means to hold the support against pivotal movement and effect downward and lateral movement of said ironing head independently of the support into pressing engagement with the buck.

GEORGE C. ENGBRECHT.
ARTHUR J. OLSEN.
ANTON M. OLSEN.